(12) United States Patent
Gupta et al.

(10) Patent No.: US 12,199,945 B2
(45) Date of Patent: Jan. 14, 2025

(54) KUBEFLOW NETWORK PROTOCOL COMPATIBILITY IMPLEMENTATION

(71) Applicant: Rakuten Mobile, Inc., Tokyo (JP)

(72) Inventors: Ayush Gupta, Indore (IN); Shashank Srivastava, Indore (IN); Vijay Nag Bs, Indore (IN)

(73) Assignee: RAKUTEN MOBILE, INC., Tokyo (JP)

( * ) Notice: Subject to any disclaimer, the term of this patent is extended or adjusted under 35 U.S.C. 154(b) by 0 days.

(21) Appl. No.: 18/001,872

(22) PCT Filed: Oct. 17, 2022

(86) PCT No.: PCT/US2022/046824
§ 371 (c)(1),
(2) Date: Dec. 15, 2022

(87) PCT Pub. No.: WO2024/085853
PCT Pub. Date: Apr. 25, 2024

(65) Prior Publication Data
US 2024/0275761 A1    Aug. 15, 2024

(51) Int. Cl.
*G06F 15/173* (2006.01)
*H04L 61/251* (2022.01)
*H04L 61/4541* (2022.01)
*H04L 67/02* (2022.01)

(52) U.S. Cl.
CPC ........ *H04L 61/4541* (2022.05); *H04L 61/251* (2013.01); *H04L 67/02* (2013.01)

(58) Field of Classification Search
None
See application file for complete search history.

(56) References Cited

U.S. PATENT DOCUMENTS 11,005,949 B1 * 5/2021 Baturin ............... H04L 61/4511

* cited by examiner

*Primary Examiner* — Wing F Chan
*Assistant Examiner* — Andrew Woo
(74) *Attorney, Agent, or Firm* — HAUPTMAN HAM, LLP

(57) ABSTRACT

Kubeflow network protocol compatibility is implemented by modifying a manifest of a first component in a Kubeflow manifest bundle to replace an alphanumeric address within each service discovery specification with a domain name, modifying a manifest of a second component in the Kubeflow manifest bundle to replace a first network protocol identity within each application network binding specification with a second network protocol identity, and applying the manifest of the first component and the manifest of the second component within a network operating in accordance with a second network protocol.

20 Claims, 20 Drawing Sheets

KUBEFLOW MANIFEST BUNDLE

Kubeflow v1.3.0
- 📁 .github
- 📁 apps
- 📁 common
- 📁 contrib
- 📁 distributions
- 📁 docs
- 📁 example
- 📁 hack
- 📁 tests
- 📄 .gitignore
- 📄 LICENSE
- 📄 OWNERS
- 📄 README.md
- 📄 go.mod
- 📄 go.sum
- 📄 prow_config.yaml

*FIG. 3*

```
TERMINAL
```
Using Profiles service at
    http://[240b:c0e0:103:544d:b474:2:0:b342]:8081/kfam    — 542
Server listening on port http://localhost:8082 (in production mode)
Unable to fetch Nodes { Error: getaddrinfo ENOTFOUND 240b 240b:443 at
    GetAddrInfoReqWrap.onlookup [as oncomplete] (dns.js:56:26)
    errno: 'ENOTFOUND',
    code: "ENOTFOUND',
    syscall: 'getaddrinfo',
    hostname: '240b",
    host: '240b',
    port: '443'}
Unable to fetch Application information: Error: getaddrinfo ENOTFOUND
    240b 240b:443at GetAddrInfoReqWrap.onlookup [as oncomplete]
    (dns.js:56:26)
    errno: 'ENOTFOUND',
    code: "ENOTFOUND",
    syscall: 'getaddrinfo',
    hostname: '240b",
    host: '240b',
    port: '443' }
Unable to fetch Events for mykube: { Error: getaddrinfo ENOTFOUND 240b
    248b:443at GetAddrInfoReqWrap.onlookup [as oncomplete]
    (dns.js:56:26)
    errno: 'ENOTFOUND",
    code: ENOTFOUND",
    syscall: 'getaddrinfo',
    hostname: '240b",
    host: 240bport: '443'

```
TERMINAL

...

KFSERVING_CONTROLLER_MANAGER_SERVICE_SERVICE_PORT=443
METADATA_ENVOY_SERVICE_PORT_9090_TCP_PORT=9090
KATIB_UI_SERVICE_PORT_UI=80
ARTIFACTS_SERVICE_PROXY_PORT=80
KUBEFLOW_USERID_PREFIX=
XGBOOST_OPERATOR_SERVICE_PORT_443_TCP_PORT=443
VOLUMES_WEB_APP_SERVICE_PORT_80_TCP_PORT=80
KATIB_CONTROLLER_PORT_443_TCP=
    tcp://[240b:c0e0:205:547b:b4a4:2:0:9e72]:443
KUBERNETES_SERVICE_HOST=240b:c0e0:205:547b:b4a4:2:0:8001    ← 642
METADATA_ENVOY_SERVICE_PORT_9090_TCP_PROTO=tcp
PWD=/server
METADATA_ENVOY_SERVICE_PORT=
    tcp://[240b:c0e0:205:547b:b4a4:2:0:a158]:9090
ML_PIPELINE_SERVICE_HOST=240b:c0e0:205:547b:b4a4:2:0:ee0a
VOLUMES_WEB_APP_SERVICE_PORT_80_TCP_PROTO=tcp
KUBEFLOW_PIPELINES_PROFILE_CONTROLLER_SERVICE_PORT_HTTP=80
KFSERVING_CONTROLLER_MANAGER_METRICS_SERVICE_PORT_8443_TCP_
    ADDR=240b:c0e0:205:547b:b4a4:2:0:8b5c
NGINX_PORT_80_TCP_ADDR=240b:c0e0:205:547b:b4a4:2:0:805c
XGBOOST_OPERATOR_SERVICE_PORT_443_TCP_PROTO=tcp
METADATA_ENVOY_SERVICE_SERVICE_PORT=9090
KUBEFLOW_USERID_HEADER=kubeflow-userid
PROFILES_KFAM_SERVICE_HOST=240b:c0e0:205:547b:b4a4:2:0:a86d

| NAME | TYPE | CLUSTER-IP |
|---|---|---|
| admission-webhook-service | ClusterIP | 240b:c0e0:205:547b:b4a4:2:0:85b1 |
| cache-server | ClusterIP | 240b:c0e0:205:547b:b4a4:2:0:8064 |
| Catalogue | NodePort | 240b:c0e0:205:547b:b4a4:2:0:8d94 |
| Centraldashboard | ClusterIP | 240b:c0e0:205:547b:b4a4:2:0:d74e |
| jupyter-web-app-service | ClusterIP | 240b:c0e0:205:547b:b4a4:2:0:d5b7 |
| katib-controller | ClusterIP | 240b:c0e0:205:547b:b4a4:2:0:9e72 |
| katib-db-manager | ClusterIP | 240b:c0e0:205:547b:b4a4:2:0:bf2a |
| katib-mysql | ClusterIP | 240b:c0c0:205:547b:b4a4:2:0:e27a |
| katib-ui | ClusterIP | 240b:c0e0:205:547b:b4a4:2:0:b93b |
| metadata-envoy-service | ClusterIP | 240b:c0e0:205:547b:b4a4:2:0:158 |
| metadata-grpc-service | ClusterIP | 240b:c0e0:205:547b:b4a4:2:0:f38d |
| ml-pipeline | ClusterIP | 240b:c0e0:205:547b:b4a4:2:0:ee0a |
| ml-pipeline-ui | ClusterIP | 240b:c0e0:205:547b:b4a4:2:0:83ea |
| ml-pipeline-visualizationserver | ClusterIP | 240b:c0e0:205:547b:b4a4:2:0:ff5a |
| mysql | ClusterIP | 240b:c0e0:205:547b:b4a4:2:0:8301 |
| nginx | NodePort | 240b:c0e0:205:547b:b4a4:2:0:805c |
| notebook-controller-service | ClusterIP | 240b:c0e0:205:547b:b4a4:2:0:e02c |
| profiles-kfam | ClusterIP | 240b:c0e0:205:547b:b4a4:2:0:086d |
| pytorch-operator | ClusterIP | 240b:c0e0:205:547b:b4a4:2:0:0755 |
| tensorboards-web-app-service | ClusterIP | 240b:c0e0:205:547b:b4a4:2:0:9042 |
| tf-job-operator | ClusterIP | 240b:c0e0:205:547b:b4a4:2:0:6994 |
| volumes-web-app-service | ClusterIP | 240b:c0e0:205:547b:b4a4:2:0:06dd |
| workflow-controller-metrics | ClusterIP | 240b:c0e0:205:547b:b4a4:2:0:e5ec |
| xgboost-operator-service | ClusterIP | 2400:c0e0:205:547b:b4a4:2:0:c94c |
| ...... | | |

814 — File: apps/pipeline/upstream/third-party/metacontroller/base/stateful-set.yaml 816 — Change:
------------------------------------

...

...

name: metacontroller env:

- name: KUBERNETES_SERVICE_HOST value: kubernetes.default.svc.cluster.local

818 ports:

File: apps/pipeline/upstream/base/pipeline/ml-pipeline-apiserver-deployment.yaml Change: 916
----------------------------------

...

...

containers:

- env:

- name: ML_PIPELINE_VISUALIZATIONSERVER_SERVICE_HOST value: ml-pipeline-visualizationserver.kubeflow.svc.cluster.local

- name: MINIO_SERVICE_SERVICE_HOST value: minio-service.kubeflow.svc.cluster.local

```
File: apps/pipeline/upstream/base/pipeline/ml-pipeline-ui-
deployment.yaml
                                    1014

Change: 1016
---------------------------------
...
env:                       1018

- name: METADATA_ENVOY_SERVICE_SERVICE_HOST value: metadata-envoy-service.kubeflow.svc.cluster.local

```
File: apps/pipeline/upstream/base/installs/multi-user/pipelines-ui/deployment-patch.yaml Change:
----------------------------------
...
...
env:

- name: ML_PIPELINE_SERVICE_HOST value: ml-pipeline.kubeflow.svc.cluster.local

- name: KUBERNETES_SERVICE_HOST value: kubernetes.default.svc.cluster.local

...
...

- name: METADATA_ENVOY_SERVICE_SERVICE_HOST value: metadata-envoy-service.kubeflow.svc.cluster.local

...
...
----------------------------------
```

1216 (Change:)
1218
1212

FIG. 11

File: apps/pipeline/upstream/base/installs/multi-user/pipelines-profile-controller/deployment.yaml — 1314

Change: — 1316

```
...
env:
- name: KUBERNETES_SERVICE_HOST
   value: kubernetes.default.svc.cluster.local
...
```
1318

1312  *FIG. 12*

File: apps/centraldashboard/upstream/base/deployment.yaml — 1414

Change: — 1416

```
...
env:
...
- name: KUBERNETES_SERVICE_HOST
   value: $(CD_SERVICE_HOST)
...
```
1418

File: apps/centraldashboard/upstream/base/kustomization.yaml

Change: 1516

---

...

...

```
- fieldref:

fieldPath: data.CD_SERVICE_HOST name: CD_SERVICE_HOST objref:

apiVersion: v1 kind: ConfigMap name: centraldashboard-parameters
```

File: apps/centraldashboard/upstream/base/params.env

Change: 1616

---

...

...

CD_CLUSTER_DOMAIN=cluster.local

CD_USERID_HEADER=kubeflow-userid

CD_USERID_PREFIX=

CD_REGISTRATION_FLOW=false

CD_SERVICE_HOST=kubernetes.default.svc.cluster.local   ← 1618

```
File: apps/pipeline/upstream/base/metadata/base/metadata-
envoy-deployment.yaml Change: 1716
----------------------------------
...
...
containers:

- name: container image: gcr.io/ml-pipeline/metadata-envoy:1.5.0 command: ["sh", "-c"]
```

```
args:

- "sed -e 's/0.0.0.0/\"::\"/g' -i /etc/envoy.yaml && exec
    /usr/local/bin/envoy -c /etc/envoy.yaml"
```

```
File: apps/volumes-web-app/upstream/base/deployment.yaml

Change: 1816
----------------------------------
...
...

containers:

- name: volumes-web-app image: volumes-web-app:v1.0.57 command: ["bash", "-c"]
 ┌─────────────────────────────────────────────────┐
 │ args: ["gunicorn -w 3 --bind [::]:5000 --access-logfile - │
 │    entrypoint:app"]                             │
 └─────────────────────────────────────────────────┘
...           1818
...
----------------------------------
```
1812

File: apps/tensorboard/tensorboards-web-app/upstream/base/deployment.yaml

Change: 1916
----------------------------------

...
...

containers:

- name: tensorboards-web-app command: ["bash", "-c"]

```
args: ["gunicorn -w 3 --bind [::]:5000 --access-logfile -
   entrypoint:app"]
```

File: apps/jupyter/jupyter-web-app/upstream/base/deployment.yaml

Change: 2016
--------------------------------

...

...

containers:
- name: jupyter-web-app
  image: jupyter-web-app:dummy
  command: ["bash", "-c"]
  args:
  - |
    sed -ie "s/storage_class_name=.*/storage_class_name=\"jupyter-web-app-ai-notebook\",/"  /src/apps/common/utils.py;
    sed -i 's/"class": vol_class,/"class": "jupyter-web-app-ai-notebook",/'  /src/apps/common/form.py;

```
gunicorn -w 3 --bind [::]:5000 --access-logfile -
   entrypoint:app
```

File: apps/pipeline/upstream/base/installs/multi-user/pipelines-profile-controller/sync.py Change: 2116
----------------------------------
...

mlpipeline_minio_secret_key = base64.b64encode(
    bytes(os.environ.get("MINIO_SECRET_KEY"), 'utf-8')).decode('utf-8')

```
class HTTPServerV6(HTTPServer):
    address_family = socket.AF_INET6
```
2118

...

self.send_response(200)
    self.send_header("Content-type", "application/json")
    self.end_headers()
    self.wfile.write(bytes(json.dumps(desired), 'utf-8'))

```
HTTPServerV6(("::", 8080), Controller).serve_forever()
```
2118

KUBEFLOW NETWORK PROTOCOL COMPATIBILITY IMPLEMENTATION

RELATED APPLICATIONS

The present application is a National Phase of International Application No. PCT/US2022/046824 filed Oct. 17, 2022.

BACKGROUND

Technical Field

This description relates to Kubeflow network protocol compatibility implementation.

Background

Kubeflow is a free and open-source machine learning platform designed to enable using machine learning pipelines to orchestrate complicated workflows running on Kubernetes. Kubeflow works natively with Internet Protocol version 4 (IPv4) network technology.

SUMMARY

According to at least some embodiments of the present invention, Kubeflow network protocol compatibility is implemented by modifying a manifest of a first component in a Kubeflow manifest bundle to replace an alphanumeric address within each service discovery specification with a domain name, modifying a manifest of a second component in the Kubeflow manifest bundle to replace a first network protocol identity within each application network binding specification with a second network protocol identity, and applying the manifest of the first component and the manifest of the second component within a network operating in accordance with a second network protocol.

Some embodiments include the instructions in a computer program, the method performed by the processor executing the instructions of the computer program, and an apparatus that performs the method. In some embodiments, the apparatus includes a controller including circuitry configured to perform the operations in the instructions.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 3 is a top level folder view of a Kubeflow manifest bundle, according to at least some embodiments of the present invention.

FIG. 5 is a terminal log of an error in connecting using an IPv6 network address, according to at least some embodiments of the present invention.

FIG. 6 is a terminal log showing associations of component names and IPv6 network addresses, according to at least some embodiments of the present invention.

FIG. 7 is a file showing component service names, each component name associated with an IPv6 network address, according to at least some embodiments of the present invention.

FIG. 8 is a change instruction for a manifest of a metacontroller component, according to at least some embodiments of the present invention.

FIG. 9 is a change instruction for a manifest of a machine learning Application Programming Interface (API) server component, according to at least some embodiments of the present invention.

FIG. 10 is a change instruction for a manifest of a machine learning pipeline user interface component, according to at least some embodiments of the present invention.

FIG. 11 is a change instruction for a manifest of a patch for a machine learning pipeline user interface component, according to at least some embodiments of the present invention.

FIG. 12 is a change instruction for a manifest of a pipeline profile controller component, according to at least some embodiments of the present invention.

FIG. 13 is a change instruction for a deployment manifest of a central dashboard component, according to at least some embodiments of the present invention.

FIG. 14 is a change instruction for a kustomization manifest of a central dashboard component, according to at least some embodiments of the present invention.

FIG. 15 is a change instruction for a manifest of an environmental variable for a central dashboard component, according to at least some embodiments of the present invention.

FIG. 16 is a change instruction for a manifest of a metadata envoy component, according to at least some embodiments of the present invention.

FIG. 17 is a change instruction for a manifest of a volume web application component, according to at least some embodiments of the present invention.

FIG. 18 is a change instruction for a manifest of a tensor board web application component, according to at least some embodiments of the present invention.

FIG. 19 is a change instruction for a manifest of a jupyter web application component, according to at least some embodiments of the present invention.

FIG. 20 is a change instruction for a manifest bundle of a pipeline profile controller component, according to at least some embodiments of the present invention.

DETAILED DESCRIPTION

Figure 1:
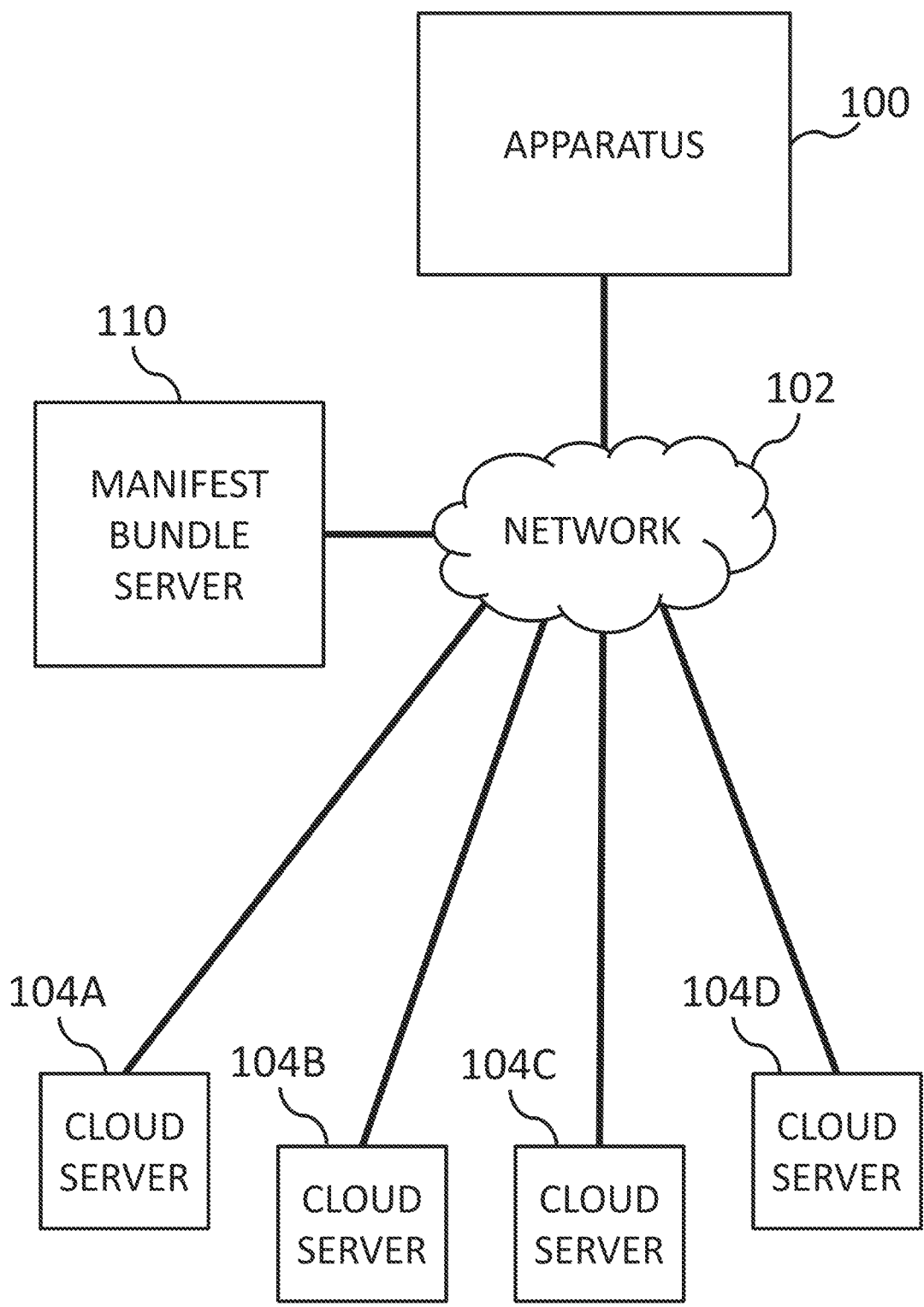
FIG. 1 is a block diagram of a system for implementing Kubeflow network protocol compatibility, according to at least some embodiments of the present invention.

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated.

In addition, the present disclosure may repeat reference numerals and/or letters in the various examples. This repetition is for the purpose of simplicity and clarity and does not in itself dictate a relationship between the various embodiments and/or configurations discussed.

While updated versions of Kubeflow are constantly issued, as of Kubeflow v.1.3.0, the program does not work natively with other network protocols, such as IPv6 network technology. In some machine learning platform solutions, Kubeflow desirably runs on advanced IPv6 network technology, but such an implementation is not available. However, in at least some embodiments various code and manifest changes are introduced to implement IPv6 network compatibility to Kubeflow. In at least some embodiments, a Kubeflow platform is built on IPv6 network technology, which enables leverage of benefits of IPv6 such as more addresses, better security, etc.

As used herein, Kubeflow refers to the free and open-source machine learning platform designed to enable using machine learning pipelines to orchestrate complicated workflows running on Kubernetes, compiled from a manifest bundle of Kubeflow under the Apache-2.0 license, such as but not limited to Kubeflow 1.3.0 available at https://github.com/kubeflow/manifests/tree/v1.3.0. At least some of the techniques used herein are applicable to many versions of Kubeflow.

FIG. 1 is a block diagram of a system for implementing Kubeflow network protocol compatibility, according to at least some embodiments of the present invention. The system includes an apparatus 100, a network 102, a plurality of cloud servers 104A, 104B, 104C, and 104D, and a manifest bundle server 110.

Apparatus 100 is connected to network 102. In at least some embodiments, apparatus 100 is in communication with manifest bundle server 110 and cloud servers 104A-D through network 102. In at least some embodiments, apparatus 100 is a computer, such as a desktop computer, notebook computer, handheld computer, etc. In at least some embodiments, apparatus 100 includes an application execution environment, such as an operating system. In at least some embodiments, apparatus 100 is a server, a plurality of servers, a portion of a server, a virtual instance of cloud computing, etc. In at least some embodiments, apparatus 100 is configured for implementing Kubeflow network protocol compatibility. In at least some embodiments, apparatus 100 performs the operations described hereinafter with respect to FIG. 2.

Network 102 is connected to apparatus 100, cloud servers 104A-D, and manifest bundle server 110. In at least some embodiments, network 102 is configured to relay communication among apparatus 100, cloud servers 104A-D, and manifest bundle server 110. In at least some embodiments, network 102 is a local area network (LAN), a wide area network (WAN), such as the internet, a radio access network (RAN), or any combination. In at least some embodiments, network 102 is a packet-switched network operating according to IPv6 or another internet protocol that is not natively supported by Kubeflow.

Cloud servers 104A-D are connected to network 102. In at least some embodiments, each of cloud servers 104A-D is a server, a plurality of servers, a portion of a server, a virtual instance of cloud computing, etc. In at least some embodiments, each of cloud servers 104A-D is configured to run one or more Kubeflow components, such as Kubeflow applications. In at least some embodiments, each of cloud servers 104A-D is configured to run Kubeflow applications in containers. In at least some embodiments, cloud servers 104A-D are among a plurality of cloud servers in a cloud computing environment.

Figure 2:
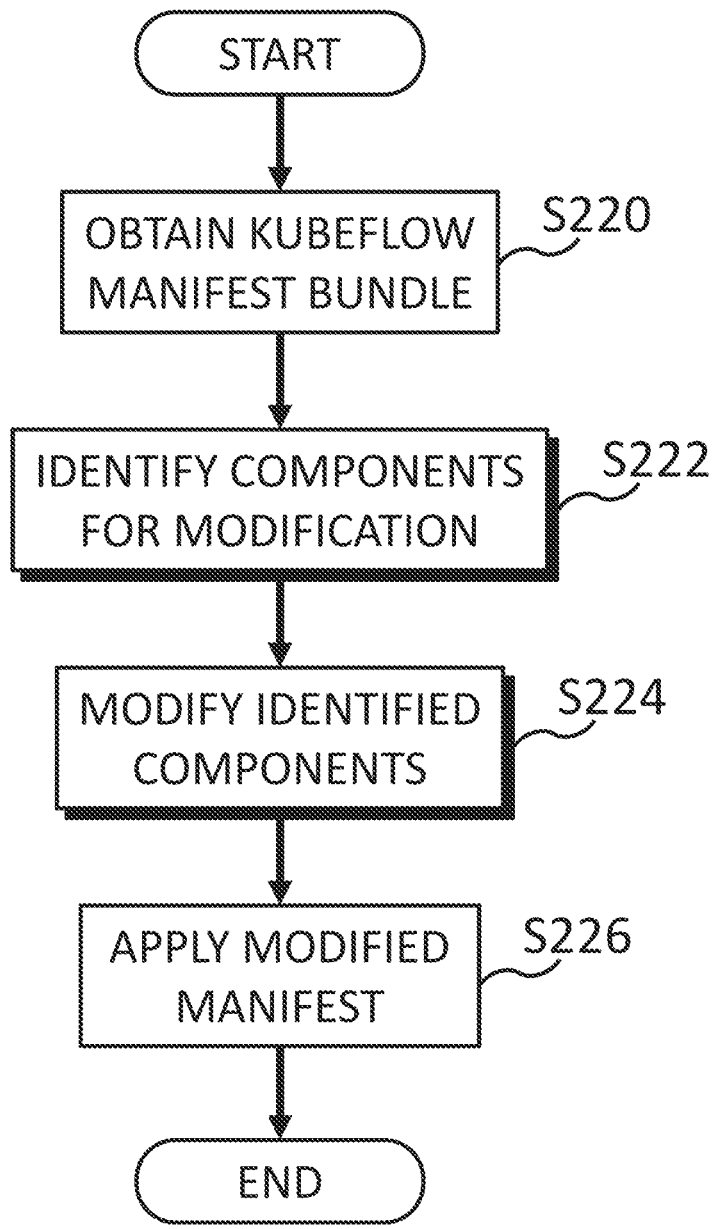
FIG. 2 is an operational flow for implementing Kubeflow network protocol compatibility, according to at least some embodiments of the present invention.

FIG. 2 is an operational flow for implementing Kubeflow network protocol compatibility, according to at least some embodiments of the present invention. The operational flow provides a method of implementing Kubeflow network protocol compatibility. In at least some embodiments, the method is performed by a controller of an apparatus including sections for performing certain operations, such as the controller and apparatus shown in FIG. 21, which will be explained hereinafter.

At S220, the controller or a section thereof obtains a Kubeflow manifest bundle. In at least some embodiments, the controller downloads the Kubeflow manifest bundle from a manifest bundle server, such as manifest bundle server 102 of FIG. 1. In at least some embodiments, the Kubeflow manifest bundle includes example manifests and a plurality of manifest bundle files, each manifest bundle file corresponding to a component of Kubeflow.

FIG. 3 is a top level folder view of a Kubeflow manifest bundle 310, according to at least some embodiments of the present invention. In at least some embodiments, the controller downloads Kubeflow v1.3.0 in a file hierarchy format, such as that shown in Kubeflow manifest bundle 310. In at least some embodiments, the controller obtains only manifest bundle and manifest files without downloading additional files, such as README.md, LICENSE, OWNERS, etc.

At S222, an identifying section of the controller identifies components for modification. In at least some embodiments, the identifying section identifies components among the plurality of components making up Kubeflow to determine which components are incompatible with the desired network protocol. In at least some embodiments, the identifying section is configured to perform operations described hereinafter with respect to FIG. 4.

At S224, a modifying section of the controller modifies identified components. IN at least some embodiments, the modifying section modifies components identified for modification, such as the components identified by the identifying section at S222. In at least some embodiments, the modifying section is configured to perform operations described hereinafter with respect to FIG. 4.

At S226, an applying section of the controller applies the Kubeflow manifest bundle. In at least some embodiments, the applying section applies the Kubeflow manifest bundle within a network operating in accordance with a second network protocol. In at least some embodiments, the applying section applies the Kubeflow manifest bundle including any manifest files modified by the modifying section at S224. In at least some embodiments, the applying section applies the Kubeflow manifest bundle in accordance with manifests, such as any manifest files modified by the modifying section at S224. In at least some embodiments, the applying section applies the Kubeflow manifest bundle to an executable within a certain operating system, such as MICROSOFT WINDOWS, LINUX, IOS, ANDROID, etc.

Figure 4:
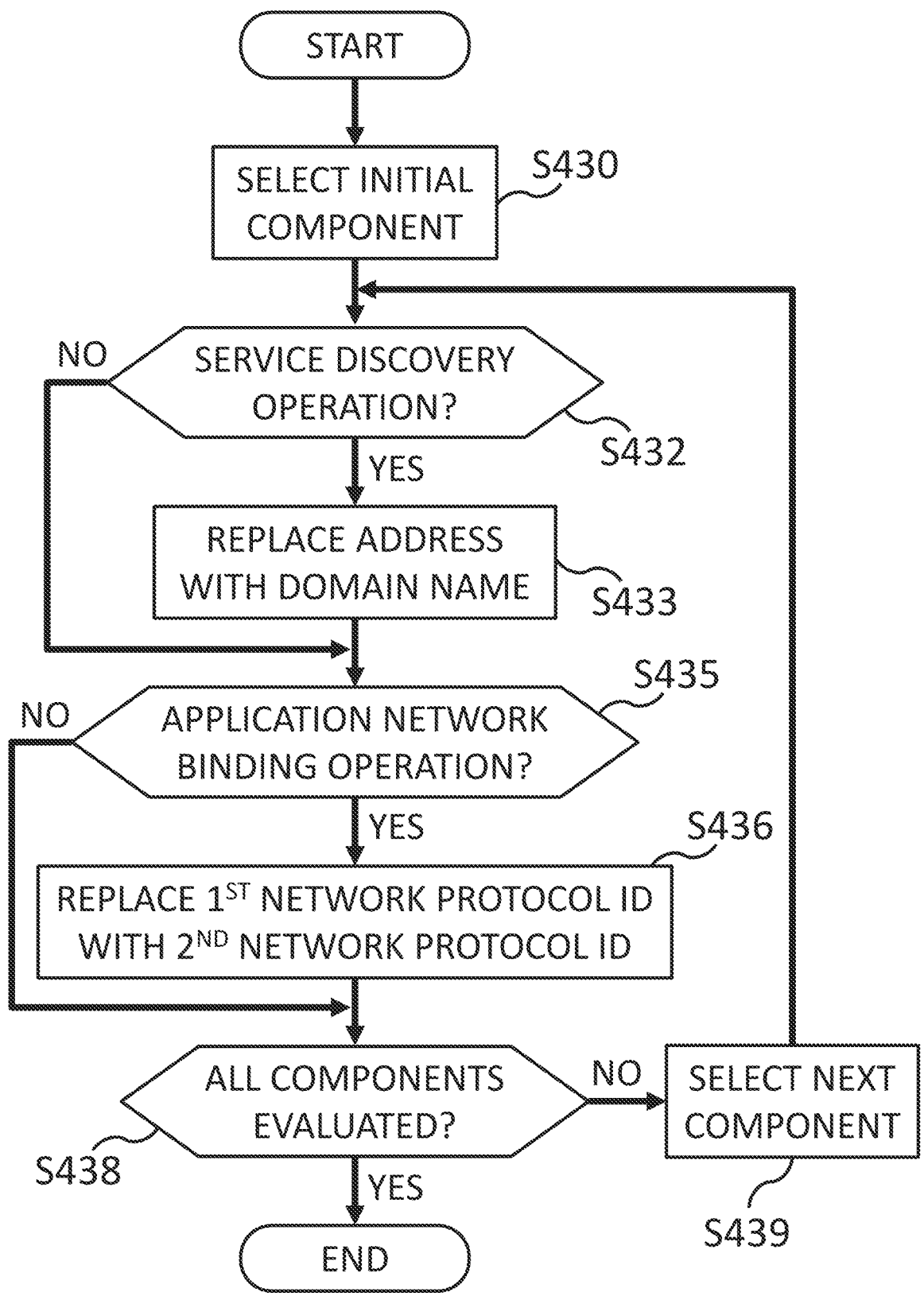
FIG. 4 is an operational flow for identifying and modifying components, according to at least some embodiments of the present invention.

FIG. 4 is an operational flow for identifying and modifying components, according to at least some embodiments of the present invention. The operational flow provides a method of identifying and modifying components. In at least some embodiments, the method is performed by an identifying section and a modifying section, such as in the apparatus shown in FIG. 21, which will be explained hereinafter.

At S430, the identifying section or a sub-section thereof selects an initial component for identification. In at least some embodiments, the identifying section selects at random or according to a predetermined order.

At S432, the identifying section or a sub-section thereof determines whether a service discovery operation exists. In at least some embodiments, the identifying section determines whether the component includes an operation for discovering services available from components executed by other network elements. In at least some embodiments, the identifying section identifies, among a plurality of components in the Kubeflow manifest bundle, the first component having the service discovery operation. In at least some embodiments, the identifying section executes the component to monitor the output for attempts to discover network services. In at least some embodiments, the identifying section executes the component to monitor the output for attempts to communicate with another network element. If the identifying section determines that a service discovery operation exists, then the operational flow proceeds to S433 for address replacement. If the identifying section determines that a service discovery operation does not exist, then the operational flow proceeds to S435 for network binding operation discovery.

FIG. 5 is a terminal log 540 of an error in connecting using an IPv6 network address, according to at least some embodiments of the present invention. An output 542 conveys that this component is attempting to communicate with a service at "http://[240b:c0e0:103:544d:b474:2:0:b342]:8081/kfam". However, the network address of the service is an IPv6 address. The various errors that follow output 542 in terminal log 540 clarify that this component attempting to communicate with the service as if the network address was an IPv4 address. Therefore, this component not only has a service discovery operation, but the component has demonstrated that communication using IPv6 addresses is not possible.

FIG. 6 is a terminal log 640 showing associations of component names and IPv6 network addresses, according to at least some embodiments of the present invention. For example, an output 642 shows that the "KUBERNETES_SERVICE_HOST" is associated with an IPv6 address of "240b:c0e0:205:547b:b4a4:2:0:8001". Due to this association, any components that attempt to communicate with "KUBERNETES_SERVICE_HOST" will read the associated IPv6 address.

FIG. 7 is a file 750 showing component service names, each component name associated with an IPv6 network address, according to at least some embodiments of the present invention. File 750 shows default IPv6 addresses associated with each component name. In this manner, even component operations that do not specify a network address will not operate properly unless the component is configured for IPv6 addresses.

At S433, the modifying section or a sub-section thereof replaces addresses with domain names. In at least some embodiments, the modifying section replaces any instances of an alphanumeric address having a format associated with a native network protocol with a domain name. In at least some embodiments, the modifying section modifies a manifest of a first component in a Kubeflow manifest bundle to replace an alphanumeric address within each service discovery specification with a domain name. In at least some embodiments, the modifying section adds lines to associate components with a domain name, such as when the component attempts to communicate with an application via an alphanumeric address by default. In at least some embodiments, the domain name of each service discovery operation is a Fully Qualified Domain Name. In at least some embodiments, the modifying section replaces the address with a fully qualified domain name (FQDN). In at least some embodiments, the modifying section modifies the manifest or a portion of a manifest associated with the component selected at S430. FIGS. 8-16 are change instructions, each of which adds lines to a respective manifest effectively replacing the association to a network address with an association to an FQDN.

FIG. 8 is a change instruction 812 for a manifest of a metacontroller component, according to at least some embodiments of the present invention. Change instruction 812 specifies a location 814 of the manifest and a change content 816. Change content 816 includes a new content 818 between content that exists in a default manifest of the metacontroller component, showing both the content and the location. New content 818 associates "KUBERNETES_SERVICE_HOST" with an FQDN "kubernetes.default.svc.cluster.local". In response to this change to the manifest, the metacontroller component will connect to "KUBERNETES_ SERVICE_HOST" through the FQDN "kubernetes.default.svc.cluster.local" instead of defaulting to the network address.

FIG. 9 is a change instruction 912 for a manifest of a machine learning API server component, according to at least some embodiments of the present invention. Change instruction 912 specifies a location 914 of the manifest and a change content 916. Change content 916 includes a new content 918 between content that exists in a default manifest of the machine learning API server component, showing both the content and the location. New content 918 associates "ML_PIPELINE_VISUALIZATIONSERVER_SERVICE_HOST" with an FQDN "ml-pipeline-visualization-server.kubeflow.svc.cluster.local" and "MINIO_SERVICE_SERVICE_HOST" with an FQDN "minio-service.kubeflow.svc.cluster.local". In response to this change to the manifest, the machine learning API server component will connect to "ML_PIPELINE_VISUALIZATIONSERVER_SERVICE_HOST" with an FQDN "ml-pipeline-visualizationserver.kubeflow.svc.cluster.local" and to "MINIO_SERVICE_SERVICE_HOST" with an FQDN "minio-service.kubeflow.svc.cluster.local" instead of defaulting to the network addresses.

FIG. 10 is a change instruction 1012 for a manifest of a first machine learning pipeline user interface component, according to at least some embodiments of the present invention. Change instruction 1012 specifies a location 1014 of the manifest and a change content 1016. Change content 1016 includes a new content 1018 between content that exists in a default manifest of the first machine learning pipeline user interface component, showing both the content and the location. New content 1018 associates "METADATA_ENVOY_SERVICE_SERVICE_HOST" with an FQDN "metadata-envoy-service.kubeflow.svc.cluster.local". In response to this change to the manifest, the first machine learning pipeline user interface component will connect to "METADATA_ENVOY_SERVICE_SERVICE_HOST" through the FQDN "metadata-envoy-service.kubeflow.svc.cluster.local" instead of defaulting to the network address.

FIG. 11 is a change instruction 1212 for a manifest of a patch for a machine learning pipeline user interface component, according to at least some embodiments of the present invention. Change instruction 1212 specifies a location 1214 of the manifest and a change content 1216. Change content 1216 includes a new content 1218 between content that exists in a default manifest of the patch for the machine learning pipeline user interface component, showing both the content and the location. New content 1218 associates "ML_PIPELINE_SERVICE_HOST" with an FQDN "ml-pipeline.kubeflow.svc.cluster.local", "KUBERNETES_SERVICE_HOST" with an FQDN "kubernetes.default.svc.cluster.local", and "METADATA_ENVOY_SERVICE_HOST" with an FQDN "metadata-envoy-service.kubeflow.svc.cluster.local". In response to this change to the manifest, the patch for the machine learning pipeline user interface component will connect to "ML_PIPELINE_VISUALIZATIONSERVER_SERVICE_HOST" with the FQDN "ml-pipeline-visualizationserver.kubeflow.svc.cluster.local" and to "ML_PIPELINE_SERVICE_HOST" with the FQDN "ml-pipeline.kubeflow.svc.cluster.local", to "KUBERNETES_SERVICE_HOST" with the FQDN "kubernetes.default.svc.cluster.local", and to "METADATA_ENVOY_SERVICE_HOST" with an FQDN "metadata-envoy-service.kubeflow.svc.cluster.local".

FIG. 12 is a change instruction 1312 for a manifest of a pipeline profile controller component, according to at least some embodiments of the present invention. Change instruction 1312 specifies a location 1314 of the manifest and a change content 1316. Change content 1316 includes a new content 1318 between content that exists in a default manifest of the pipeline profile controller component, showing both the content and the location. New content 1318 associates "KUBERNETES_SERVICE_HOST" with an FQDN "kubernetes.default.svc.cluster.local". In response to this change to the manifest, the pipeline profile controller component will connect to "KUBERNETES_SERVICE_HOST" through the FQDN "kubernetes.default.svc.cluster.local" instead of defaulting to the network address.

FIG. 13 is a change instruction 1412 for a deployment manifest of a central dashboard component, according to at least some embodiments of the present invention. Change instruction 1412 specifies a location 1414 of the manifest and a change content 1416. Change content 1416 includes a new content 1418 between content that exists in a default deployment manifest of the central dashboard component, showing both the content and the location. New content 1418 associates "KUBERNETES_SERVICE_HOST" with a variable "$(CD_SERVICE_HOST)". In response to this change to the deployment manifest, the central dashboard component will connect to "KUBERNETES_SERVICE_HOST" through a value specified by the "CD_SERVICE_HOST" service instead of defaulting to the network address.

FIG. 14 is a change instruction 1512 for a kustomization manifest of a central dashboard component, according to at least some embodiments of the present invention. Change instruction 1512 specifies a location 1514 of the manifest and a change content 1516. Change content 1516 includes a new content 1518 that can be added anywhere in a default kustomization manifest of the central dashboard component. New content 1518 associates "CD_SERVICE_HOST" with an FQDN "data.CD_SERVICE_HOST". In response to this change to the kustomization manifest, the central dashboard component will connect to "CD_SERVICE_HOST" through the FQDN "data.CD_SERVICE_HOST" instead of defaulting to the network address.

FIG. 15 is a change instruction 1612 for a manifest of an environmental variable for a central dashboard component, according to at least some embodiments of the present invention. Change instruction 1612 specifies a location 1614 of the manifest and a change content 1616. Change content 1616 includes a new content 1618 after content that exists in a default manifest of the environmental variable for the central dashboard component, showing both the content and the location. New content 1618 associates "CD_SERVICE_HOST" with an FQDN "kubernetes.default.svc.cluster.local". In response to this change to the manifest, the environmental variable for the central dashboard component will connect to "CD_SERVICE_HOST" through the FQDN "kubernetes.default.svc.cluster.local" instead of defaulting to the network address.

At S435, the identifying section or a sub-section thereof determines whether an application network binding operation exists. In at least some embodiments, the identifying section determines whether the component includes an operation for binding an application of the component to a network address. In at least some embodiments, the identifying section identifies, among the plurality of components in the Kubeflow manifest bundle, the second component having the application network binding operation. In at least some embodiments, the identifying section executes the component to monitor the output for attempts to bind an application from the component to a network address. In at least some embodiments, the identifying section executes the component to monitor the output for attempts to register a network address with a network server. If the identifying section determines that an application network binding operation exists, then the operational flow proceeds to S436 for network protocol identifier replacement. If the identifying section determines that an application network binding operation does not exist, then the operational flow proceeds to S438 to check for unevaluated components.

At S436, the modifying section or a sub-section thereof replaces first network protocol identifiers with second network protocol identifiers. In at least some embodiments, the modifying section replaces a first network protocol identifier identifying a network protocol natively supported by Kubeflow with a second network protocol identifier identifying a desired network protocol. In at least some embodiments, the modifying section modifies a manifest of a second component in the Kubeflow manifest bundle to replace a first network protocol identity within each application network binding specification with a second network protocol identity. In at least some embodiments, the modifying section replaces an IPv4 identifier with an IPv6 identifier. In at least some embodiments, the first network protocol identity represents an IPv4 network identity, and the second network protocol identity represents an IPv6 network identity. In at least some embodiments, the modifying section replaces "0.0.0.0", which is associated with IPv4, with "::", which is associated with an IPv6 identifier. In at least some embodiments, the IPv4 network identity is "0.0.0.0" and the IPv6 network identity is "::". In at least some embodiments, the modifying section modifies the manifest or a portion of a manifest associated with the component selected at S430. FIGS. 17-20 are change instructions, each of which adds lines to a respective manifest effectively replacing the first network protocol identifier with the second network protocol identifier.

FIG. 16 is a change instruction 1712 for a manifest of a metadata envoy component, according to at least some embodiments of the present invention. Change instruction 1712 specifies a location 1714 of the manifest and a change content 1716. Change content 1716 includes a new content 1718 after content that exists in a default manifest of the metadata envoy component, showing both the content and the location. New content 1718 replaces "0.0.0.0", which is associated with IPv4, with "::", which is associated with an IPv6 identifier. In response to this change to the manifest, the metadata envoy component will bind to an address of the second network protocol instead of defaulting to the first network protocol.

FIG. 17 is a change instruction 1812 for a manifest of a volume web application component, according to at least some embodiments of the present invention. Change instruction 1812 specifies a location 1814 of the manifest and a change content 1816. Change content 1816 includes a new content 1818 after content that exists in a default manifest of the volume web application component, showing both the content and the location. New content 1818 replaces "0.0.0.0", which is associated with IPv4, with "::", which is associated with an IPv6 identifier. In response to this change to the manifest, the volume web application component will bind to an address of the second network protocol instead of defaulting to the first network protocol.

FIG. 18 is a change instruction 1912 for a manifest of a tensor board web application component, according to at least some embodiments of the present invention. Change instruction 1912 specifies a location 1914 of the manifest and a change content 1916. Change content 1916 includes a new content 1918 after content that exists in a default manifest of the tensor board web application component, showing both the content and the location. New content 1918 replaces "0.0.0.0", which is associated with IPv4, with "::", which is associated with an IPv6 identifier. In response to this change to the manifest, the tensor board web application component will bind to an address of the second network protocol instead of defaulting to the first network protocol.

FIG. 19 is a change instruction 2012 for a manifest of a jupyter web application component, according to at least some embodiments of the present invention. Change instruction 2012 specifies a location 2014 of the manifest and a change content 2016. Change content 2016 includes a new content 2018 after content that exists in a default manifest of the jupyter web application component, showing both the content and the location. New content 2018 replaces "0.0.0.0", which is associated with IPv4, with "::", which is associated with an IPv6 identifier. In response to this change to the manifest, the jupyter web application component will bind to an address of the second network protocol instead of defaulting to the first network protocol.

Figure 21:
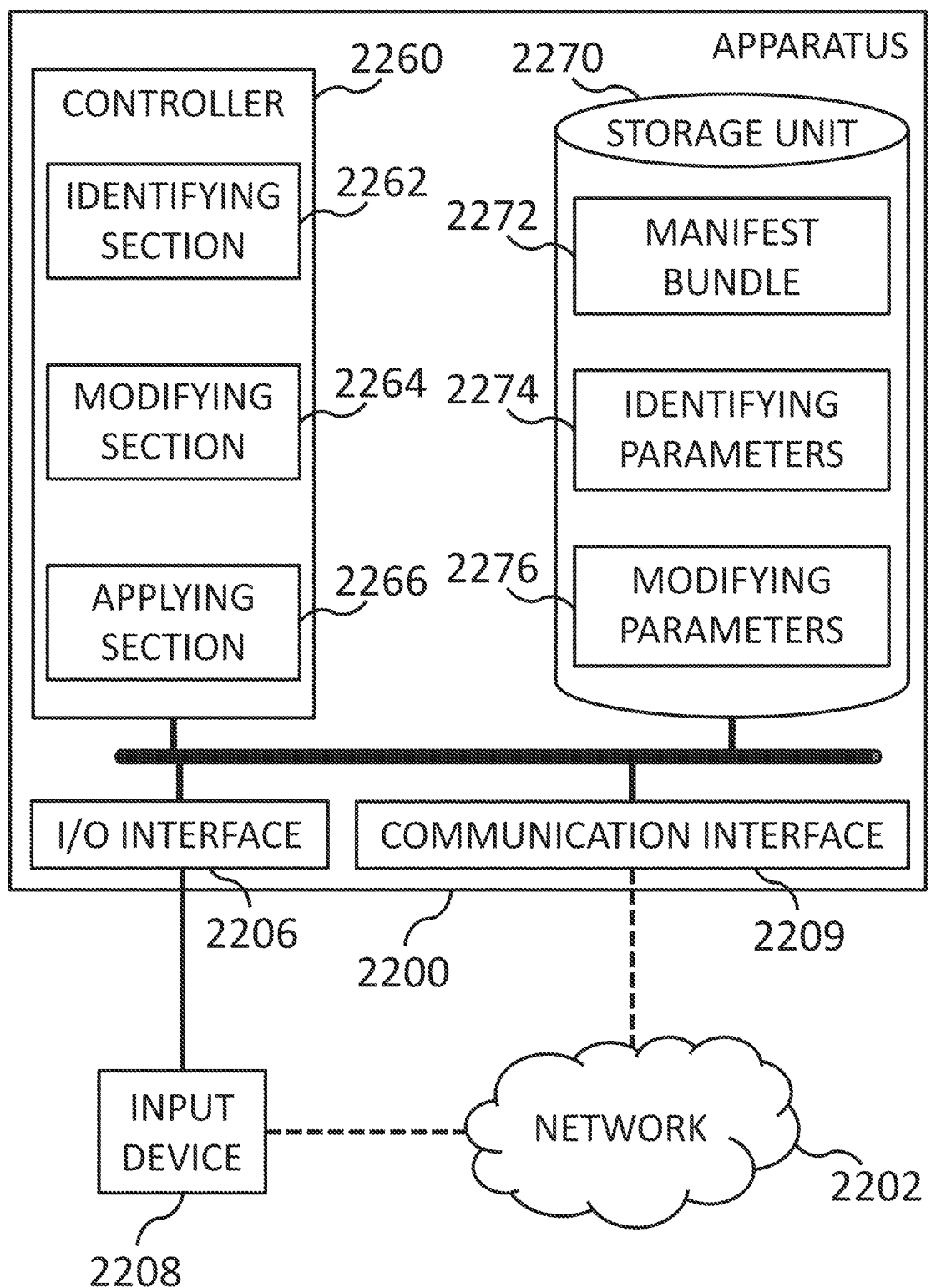
FIG. 21 is a block diagram of a hardware configuration for implementing Kubeflow network protocol compatibility, according to at least some embodiments of the present invention.

In at least some embodiments, the identifying section identifies, among a plurality of components in the Kubeflow manifest bundle, the third component having the first network HTTP server launching operation. In at least some embodiments, the modifying section replaces code for running a server that serves on the network protocol natively supported by Kubeflow with code for running a server that serves on the desired network protocol. In at least some embodiments, the modifying section modifies the Kubeflow manifest bundle associated with a third component in the Kubeflow manifest bundle to replace a first network HTTP server launching operation with a second network HTTP server launching operation. FIG. 21 is a change instruction that adds lines to a manifest bundle file to effectively replace an instruction to serve on the first network protocol identifier with an instruction to serve on the second network protocol identifier.

FIG. 20 is a change instruction 2112 for a manifest bundle of a pipeline profile controller component, according to at least some embodiments of the present invention. Change instruction 2112 specifies a location 2114 of the manifest and a change content 2116. Change content 2116 includes a new content 2118 between content that exists in a default manifest of the pipeline profile controller component, showing both the content and the location. New content 2118 specifies "HTTPServerV6", which establishes an IPv6 server, and "::", which is associated with an IPv6 identifier. In response to this change to the manifest, the pipeline profile controller component will initialize default resources of profiles on the second network protocol instead of defaulting to the first network protocol.

At S438, the controller or a section thereof determines whether all components have been evaluated. In at least some embodiments, the controller determines whether there are any components that have not been subject to identification at S432 or S435. If the controller determines that unevaluated components remain, then the operational flow proceeds to next component selection S439 before returning to service discovery operation identification at S432. If the controller determines that unevaluated components remain, then the operational flow ends.

FIG. 21 is a block diagram of a hardware configuration for implementing Kubeflow network protocol compatibility, according to at least some embodiments of the present invention.

The exemplary hardware configuration includes apparatus 2200, which interacts with display 907 and input device 2208, and communicates with network 2202. In at least some embodiments, apparatus 2200 is a computer or other computing device that receives input or commands from input device 2208. In at least some embodiments, apparatus 2200 is integrated with input device 2208. In at least some embodiments, apparatus 2200 is a computer system that executes computer-readable instructions to perform operations for embedded milestone status.

Apparatus 2200 includes a controller 2260, a storage unit 2270, an input/output interface 2206, and a communication interface 2209. In at least some embodiments, controller 2260 includes a processor or programmable circuitry executing instructions to cause the processor or programmable circuitry to perform operations according to the instructions. In at least some embodiments, controller 2260 includes analog or digital programmable circuitry, or any combination thereof. In at least some embodiments, controller 2260 includes physically separated storage or circuitry that interacts through communication. In at least some embodiments, storage unit 2270 includes a non-volatile computer-readable medium capable of storing executable and non-executable data for access by controller 2260 during execution of the instructions. Communication interface 2209 transmits and receives data from network 2202. Input/output interface 2206 connects to various input and output units, such as input device 2208, via a parallel port, a serial port, a keyboard port, a mouse port, a monitor port, and the like to accept commands and present information. In some embodiments, storage unit 2270 is external from apparatus 2200.

Controller 2260 includes identifying section 2262, modifying section 2264, and applying section 2266. Storage unit 2270 includes manifest bundle 2272, identifying parameters 2274, and modifying parameters 2276.

Identifying section 2262 is the circuitry or instructions of controller 2260 configured to identify components for modification. In at least some embodiments, identifying section 2262 is configured to identify, among a plurality of components in the Kubeflow manifest bundle, the first component having the service discovery operation, and to identify the second component having the application network binding operation. In at least some embodiments, identifying section 2262 utilizes information in storage unit 2270, such as manifest bundle 2272 and identifying parameters 2274. In at least some embodiments, identifying section 2262 includes sub-sections for performing additional functions, as described in the foregoing flow charts. In at least some embodiments, such sub-sections is referred to by a name associated with a corresponding function.

Modifying section 2264 is the circuitry or instructions of controller 2260 configured to modify components. In at least some embodiments, modifying section 2264 is configured to modify a manifest of a first component in a Kubeflow manifest bundle to replace an alphanumeric address within each service discovery specification with a domain name, and to modify a manifest of a second component in the Kubeflow manifest bundle to replace a first network protocol identity within each application network binding specification with a second network protocol identity. In at least some embodiments, modifying section 2264 utilizes information in storage unit 2270, such as manifest bundle 2272 and modifying parameters 2276. In at least some embodiments, modifying section 2264 includes sub-sections for performing additional functions, as described in the foregoing flow charts. In at least some embodiments, such sub-sections is referred to by a name associated with a corresponding function.

Applying section 2266 is the circuitry or instructions of controller 2260 configured to apply a manifest bundle to an executable program. In at least some embodiments, applying section 2266 is configured to apply the Kubeflow manifest bundle within a network operating in accordance with a second network protocol. In at least some embodiments, applying section 2266 utilizes information from storage unit 2270, such as manifest bundle 2272. In at least some embodiments, applying section 2266 includes sub-sections for performing additional functions, as described in the foregoing flow charts. In at least some embodiments, such sub-sections is referred to by a name associated with a corresponding function.

In at least some embodiments, the apparatus is another device capable of processing logical functions in order to perform the operations herein. In at least some embodiments, the controller and the storage unit need not be entirely separate devices, but share circuitry or one or more computer-readable mediums in some embodiments. In at least some embodiments, the storage unit includes a hard drive storing both the computer-executable instructions and the data accessed by the controller, and the controller includes a combination of a central processing unit (CPU) and RAM, in which the computer-executable instructions are able to be copied in whole or in part for execution by the CPU during performance of the operations herein.

In at least some embodiments where the apparatus is a computer, a program that is installed in the computer is capable of causing the computer to function as or perform operations associated with apparatuses of the embodiments described herein. In at least some embodiments, such a program is executable by a processor to cause the computer to perform certain operations associated with some or all of the blocks of flowcharts and block diagrams described herein.

At least some embodiments are described with reference to flowcharts and block diagrams whose blocks represent (1) steps of processes in which operations are performed or (2) sections of a controller responsible for performing operations. In at least some embodiments, certain steps and sections are implemented by dedicated circuitry, programmable circuitry supplied with computer-readable instructions stored on computer-readable media, and/or processors supplied with computer-readable instructions stored on computer-readable media. In at least some embodiments, dedicated circuitry includes digital and/or analog hardware circuits and include integrated circuits (IC) and/or discrete circuits. In at least some embodiments, programmable circuitry includes reconfigurable hardware circuits comprising logical AND, OR, XOR, NAND, NOR, and other logical operations, flip-flops, registers, memory elements, etc., such as field-programmable gate arrays (FPGA), programmable logic arrays (PLA), etc.

In at least some embodiments, the computer readable storage medium includes a tangible device that is able to retain and store instructions for use by an instruction execution device. In some embodiments, the computer readable storage medium includes, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

In at least some embodiments, computer readable program instructions described herein are downloadable to respective computing/processing devices from a computer readable storage medium or to an external computer or external storage device via a network, for example, the Internet, a local area network, a wide area network and/or a wireless network. In at least some embodiments, the network includes copper transmission cables, optical transmission fibers, wireless transmission, routers, firewalls, switches, gateway computers and/or edge servers. In at least some embodiments, a network adapter card or network interface in each computing/processing device receives computer readable program instructions from the network and forwards the computer readable program instructions for storage in a computer readable storage medium within the respective computing/processing device.

In at least some embodiments, computer readable program instructions for carrying out operations described above are assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. In at least some embodiments, the computer readable program instructions are executed entirely on the user's computer, partly on the user's computer, as a stand-alone software package, partly on the user's computer and partly on a remote computer or entirely on the remote computer or server. In at least some embodiments, in the latter scenario, the remote computer is connected to the user's computer through any type of network, including a local area network (LAN) or a wide area network (WAN), or the connection is made to an external computer (for example, through the Internet using an Internet Service Provider). In at least some embodiments, electronic circuitry including, for example, programmable logic circuitry, field-programmable gate arrays (FPGA), or programmable logic arrays (PLA) execute the computer readable program instructions by utilizing state information of the computer readable program instructions to individualize the electronic circuitry, in order to perform aspects of the present invention.

While embodiments of the present invention have been described, the technical scope of any subject matter claimed is not limited to the above described embodiments. Persons skilled in the art would understand that various alterations and improvements to the above-described embodiments are possible. Persons skilled in the art would also understand from the scope of the claims that the embodiments added with such alterations or improvements are included in the technical scope of the invention.

The operations, procedures, steps, and stages of each process performed by an apparatus, system, program, and method shown in the claims, embodiments, or diagrams are able to be performed in any order as long as the order is not indicated by "prior to," "before," or the like and as long as the output from a previous process is not used in a later process. Even if the process flow is described using phrases such as "first" or "next" in the claims, embodiments, or diagrams, such a description does not necessarily mean that the processes must be performed in the described order.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A non-transitory computer-readable medium including instructions executable by a processor to cause the processor to perform operations comprising:
   modifying a manifest of a first component in a kubeflow manifest bundle to replace an alphanumeric address within each service discovery operation with a domain name;
   modifying a manifest of a second component in the kubeflow manifest bundle to replace a first network protocol identity within each application network binding operation with a second network protocol identity; and
   applying the modified manifest of the first component and the modified manifest of the second component within a network operating in accordance with a second network protocol.

2. The non-transitory computer-readable medium of claim 1, wherein the domain name of each of the service discovery operation is a Fully Qualified Domain Name.

3. The non-transitory computer-readable medium of claim 1, wherein the first network protocol identity represents an IPv4 network identity, and the second network protocol identity represents an IPV6 network identity.

4. The non-transitory computer-readable medium of claim 3, wherein the IPV4 network identity is "0.0.0.0" and the IPV6 network identity is "::".

5. The non-transitory computer-readable medium of claim 1, wherein the operations further comprise:
   identifying, among a plurality of components in the kubeflow manifest bundle, the first component having the corresponding service discovery operation; and
   identifying, among the plurality of components in the kubeflow manifest bundle, the second component having the corresponding application network binding operation.

6. The non-transitory computer-readable medium of claim 1, wherein the operations further comprise:
   modifying the kubeflow manifest bundle associated with a third component in the kubeflow manifest bundle to replace a first network HTTP server launching operation with a second network HTTP server launching operation.

7. The non-transitory computer-readable medium of claim 6, wherein the operations further comprise:
   identifying, among a plurality of components in the kubeflow manifest bundle, the third component having the first network HTTP server launching operation.

8. A method comprising:
   modifying a manifest of a first component in a kubeflow manifest bundle to replace an alphanumeric address within each service discovery operation with a domain name;
   modifying a manifest of a second component in the kubeflow manifest bundle to replace a first network protocol identity within each application network binding operation with a second network protocol identity; and
   applying the modified manifest of the first component and the modified manifest of the second component within a network operating in accordance with a second network protocol.

9. The method of claim 8, wherein the domain name of each of the service discovery operation is a Fully Qualified Domain Name.

10. The method of claim 8, wherein the first network protocol identity represents an IPv4 network identity, and the second network protocol identity represents an IPv6 network identity.

11. The method of claim 10, wherein the IPV4 network identity is "0.0.0.0" and the IPv6 network identity is "::".

12. The method of claim 8, wherein the operations further comprise:
   identifying, among a plurality of components in the kubeflow manifest bundle, the first component having the corresponding service discovery operation; and
   identifying, among the plurality of components in the kubeflow manifest bundle, the second component having the corresponding application network binding operation.

13. The method of claim 8, wherein the operations further comprise:
   modifying the kubeflow manifest bundle associated with a third component in the kubeflow manifest bundle to replace a first network HTTP server launching operation with a second network HTTP server launching operation.

14. The method of claim 13, wherein the operations further comprise:

identifying, among a plurality of components in the kubeflow manifest bundle, the third component having the first network HTTP server launching operation.

15. An apparatus comprising:
a controller including circuitry configured to:
modify a manifest of a first component in a kubeflow manifest bundle to replace an alphanumeric address within each service discovery operation with a domain name;
modify a manifest of a second component in the kubeflow manifest bundle to replace a first network protocol identity within each application network binding operation with a second network protocol identity; and
apply the modified manifest of the first component and the modified manifest of the second component within a network operating in accordance with a second network protocol.

16. The apparatus of claim 15, wherein the domain name of each of the service discovery operation is a Fully Qualified Domain Name.

17. The apparatus of claim 15, wherein the first network protocol identity represents an IPv4 network identity, and the second network protocol identity represents an IPV6 network identity.

18. The apparatus of claim 17, wherein the IPv4 network identity is "0.0.0.0" and the IPV6 network identity is "::".

19. The apparatus of claim 15, wherein the circuitry is further configured to:
identify, among a plurality of components in the kubeflow manifest bundle, the first component having the corresponding service discovery operation; and
identify, among the plurality of components in the kubeflow manifest bundle, the second component having the corresponding application network binding operation.

20. The apparatus of claim 15, wherein the circuitry is further configured to:
modify the kubeflow manifest bundle associated with a third component in the kubeflow manifest bundle to replace a first network HTTP server launching operation with a second network HTTP server launching operation.

* * * * *